(12) United States Patent
Tiirola et al.

(10) Patent No.: US 10,499,424 B2
(45) Date of Patent: Dec. 3, 2019

(54) SCHEDULING REQUEST ARRANGEMENT FOR NEW RADIO

(71) Applicant: NOKIA SOLUTIONS AND NETWORKS OY, Espoo (FI)

(72) Inventors: Esa Tapani Tiirola, Kempele (FI); Kari Juhani Hooli, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 241 days.

(21) Appl. No.: 15/424,283

(22) Filed: Feb. 3, 2017

(65) Prior Publication Data

US 2018/0227949 A1 Aug. 9, 2018

(51) Int. Cl.
*H04W 74/04* (2009.01)
*H04W 72/12* (2009.01)

(52) U.S. Cl.
CPC ....... *H04W 74/04* (2013.01); *H04W 72/1289* (2013.01)

(58) Field of Classification Search
CPC .............................. H04W 74/04; H04L 5/0053
See application file for complete search history.

(56) References Cited

U.S. PATENT DOCUMENTS

| 2003/0193955 A1* | 10/2003 | Beshai | H04J 14/0227 370/395.4 |
|---|---|---|---|
| 2007/0081489 A1* | 4/2007 | Anderson | H04W 16/14 370/329 |
| 2007/0293231 A1* | 12/2007 | So | H04W 72/042 455/450 |
| 2012/0002568 A1* | 1/2012 | Tiirola | H04L 1/0026 370/252 |
| 2015/0043472 A1* | 2/2015 | Seo | H04W 36/08 370/329 |
| 2017/0078160 A1* | 3/2017 | Hong | H04L 67/32 |

* cited by examiner

*Primary Examiner* — Samina F Choudhry
(74) *Attorney, Agent, or Firm* — Squire Patton Boggs (US) LLP (57) ABSTRACT

Systems, methods, apparatuses, and computer program products for a new radio (NR) physical layer arrangement are provided. One method may include receiving, by user equipment, configuration of scheduling request resources on a plurality of resource pools. The method may also include determining a slot type when the user equipment is to transmit a scheduling request in a certain slot, and, based on the determined slot type and the received scheduling request resources configuration, determining whether the user equipment has a scheduling request resource allocated in the plurality of resource pools in the certain slot.

22 Claims, 8 Drawing Sheets

Fig. 1 a) long PUCCH     b) short PUCCH

SCHEDULING REQUEST ARRANGEMENT FOR NEW RADIO

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to a new radio (NR) physical layer design.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation (5G) or new radio (NR) wireless systems refer to the next generation (NG) of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the node B or eNB may be referred to as a gNB.

SUMMARY

An embodiment is directed to method, which may include receiving, by user equipment, configuration of scheduling request resources on a plurality of resource pools, determining a slot type when the user equipment is to transmit a scheduling request in a certain slot; and, based on the determined slot type and the received scheduling request resources configuration, determining whether the user equipment has a scheduling request resource allocated in the plurality of resource pools in the certain slot.

Another embodiment is directed to an apparatus, which may include at least one processor and at least one memory including computer program code. The at least one memory and the computer program code are configured, with the at least one processor, to cause the apparatus at least to receive configuration of scheduling request resources on a plurality of resource pools, determine a slot type when the apparatus is to transmit a scheduling request in a certain slot, and, based on the determined slot type and the received scheduling request resources configuration, determine whether the apparatus has a scheduling request resource allocated in the plurality of resource pools in the certain slot.

Another embodiment is directed to an apparatus, which may include means for receiving configuration of scheduling request resources on a plurality of resource pools, means for determining a slot type when the apparatus is to transmit a scheduling request in a certain slot, and, based on the determined slot type and the received scheduling request resources configuration, means for determining whether the apparatus has a scheduling request resource allocated in the plurality of resource pools in the certain slot.

Another embodiment is directed to a computer program embodied on a non-transitory computer readable medium. The computer program is configured to control a processor to perform a process including receiving, at user equipment, configuration of scheduling request resources on a plurality of resource pools, determining a slot type when the user equipment is to transmit a scheduling request in a certain slot; and, based on the determined slot type and the received scheduling request resources configuration, determining whether the user equipment has a scheduling request resource allocated in the plurality of resource pools in the certain slot.

Another embodiment is directed to a method, which may include configuring, by a network node, scheduling request resources for a user equipment from a plurality of resource pools. The method may also include providing the configuration of the scheduling request resources to the user equipment, and receiving a scheduling request on a scheduling request resource determined based on a slot type and the scheduling request resources configuration.

Another embodiment is directed to an apparatus, which may include at least one processor and at least one memory including computer program code. The at least one memory and the computer program code are configured, with the at least one processor, to cause the apparatus at least to configure scheduling request resources for a user equipment from a plurality of resource pools. The at least one memory and the computer program code are configured, with the at least one processor, to cause the apparatus at least to provide the configuration of the scheduling request resources to the user equipment, and receive a scheduling request on a scheduling request resource determined based on a slot type and the scheduling request resources configuration.

Another embodiment is directed to an apparatus, which may include means for configuring scheduling request resources for a user equipment from a plurality of resource pools. The apparatus may also include means for providing the configuration of the scheduling request resources to the user equipment, and means for receiving a scheduling request on a scheduling request resource determined based on a slot type and the scheduling request resources configuration.

Another embodiment is directed to a computer program embodied on a non-transitory computer readable medium. The computer program is configured to control a processor to perform a process including configuring scheduling request resources for a user equipment from a plurality of resource pools. The process may also include providing the configuration of the scheduling request resources to the user equipment, and receiving a scheduling request on a scheduling request resource determined based on a slot type and the scheduling request resources configuration.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for a new radio (NR) physical layer arrangement, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments of the present disclosure relate to 3GPP New Radio (NR) physical layer design and related 3GPP study item (SI) RP-160671. An objective of the SI is to identify and develop technology components needed for NR systems being able to use any spectrum band ranging at least up to 100 GHz. A goal is to achieve a single technical framework addressing all usage scenarios, requirements and deployment scenarios defined in 3GPP technical report (TR) 38.913. One embodiment relates to how to facilitate scheduling request (SR) transmission in a flexible way in order to accommodate different scenarios in NR, and how to use different variants of long physical uplink control channel (PUCCH) and short PUCCH for SR transmission.

SR is a special physical layer message that may be used by a UE to ask the network to send UL grant so that the UE can transmit user data on UL shared channel later on. In its simplest form SR may contain just one information bit. SR may be indicated by means of on-off keying, where UE transmits a predefined signal only in the case of positive SR. In certain scenarios SR may contain also multiple bits. The additional bits/signalling states may contain information, e.g., related to buffer status, priority, and/or latency information.

As will be discussed in detail in the following, one embodiment is built around multiple (e.g., at least two) resource pools for scheduling request (SR). Each resource pool may be associated to a predefined slot type or slot types as well as a specific PUCCH format. In an example scenario, there may be up-to three resource pools with different sizes.

When multiple resource pools are associated to the same slot type, the resource pools are non-overlapping in terms of frequency, time and/or sequence. In other words, a certain SR resource can belong only to one resource pool. When a UE is supposed to transmit SR in a certain slot, it will first determine the slot type. Based on the determined slot type and SR resource configuration, the UE may determine whether it has SR allocation available in different resource pools. If one or more SR resources are available, the UE may select one SR resource and transmit SR via current slot.

In NR frame structure design, it has been agreed that both slot and mini-slot are to be supported. The duration of a slot is either 7 or 14 symbols depending on the subcarrier spacing of the used numerology. Additionally, slot aggregation will be supported, hence increasing the possible size of the scheduling unit to be multiple slots.

Figure 1:
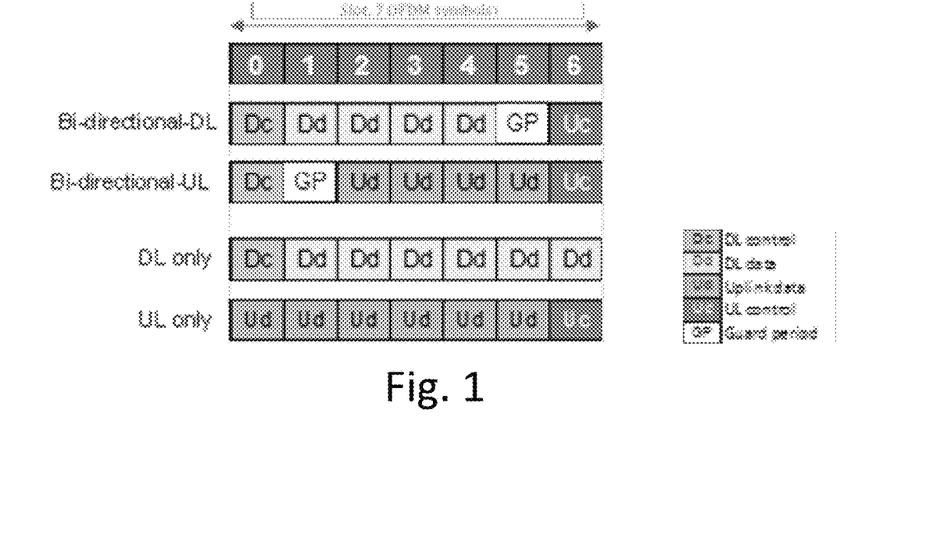
FIG. 1 illustrates a block diagram depicting the slot types, according to an embodiment.

There may be three slot types that provide the basic support for both time division duplex (TDD) and frequency division duplex (FDD). FIG. 1 illustrates a block diagram depicting the slot types. For the bi-directional slots, there is either downlink data or uplink data transmission in each slot, as well as the corresponding downlink and uplink control. Bi-directional slot facilitates many important TDD functionalities in the NR frame structure, such as link direction switching between downlink (DL) and uplink (UL), fully flexible traffic adaptation between DL and UL, and opportunity for low latency, provided that slot length is selected to be short enough.

In all slots, multiplexing between DL control, DL/UL data, guard period (GP) and UL control may be based primarily on time division multiplexing allowing fast energy efficient pipeline processing of control and data in the receiver. Physical downlink control channel (PDCCH) is conveyed in the DL control symbol(s) located at the beginning of the slot (or the mini-slot). However, the option of PDCCH and physical downlink shared channel (PDSCH) multiplexing in frequency domain is not excluded.

In addition to bi-directional slots, there are also a DL-only slot and UL-only slot in FIG. 1. These may be needed at least in FDD mode, but also in certain TDD scenarios to allow longer transmission periods in same direction.

Figure 2:
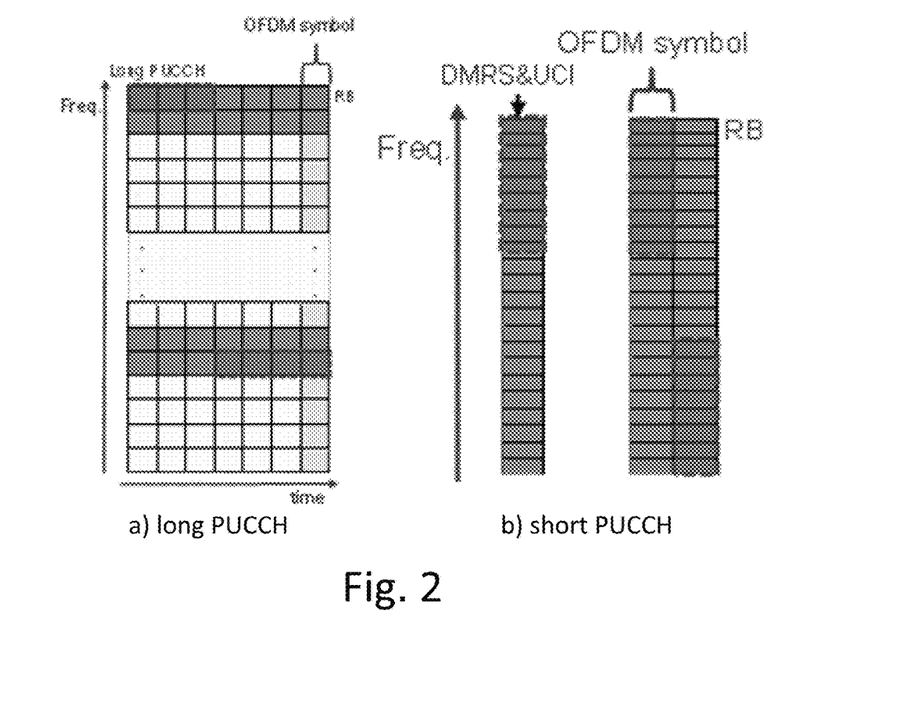
FIG. 2 illustrates two variants of PUCCH that NR may support.

NR may support two variants of PUCCH illustrated in FIG. 2. Long PUCCH shown in FIG. 2a is optimized for a coverage. In certain ways, there may be some similarity to LTE PUCCH where, for example, there may be: time division multiplexing between reference signal (RS) and control data (UCI), frequency diversity by means of frequency hopping, low peak to average power ratio (PAPR)/ cubic metric (CM) when using discrete fourier transform-spread-orthogonal frequency division multiplexing (DFT-S-OFDM) based waveform, and flexible configuration for two frequency hopping clusters. However, NR PUCCH may not follow the same design as LTE PUCCH.

Short PUCCH illustrated in FIG. 2b is optimized to facilitate low latency and also supports UL control signalling via bi-directional DL slot. A PUCCH variant that is related to mini-slot may be based on the short PUCCH structure. The actual structure of short PUCCH is still to be determined. However, it will support at least duration of one and two OFDM symbols. Frequency domain multiplexing between RS and UCI is supported. Frequency diversity on short PUCCH may be provided based on frequency hopping, clustered transmission or scheduled transmission. Scheduling request transmission on short PUCCH may be based on usage of constant amplitude zero auto correlation (CAZAC) sequences and predefined cyclic shifts(s).

Figure 3:
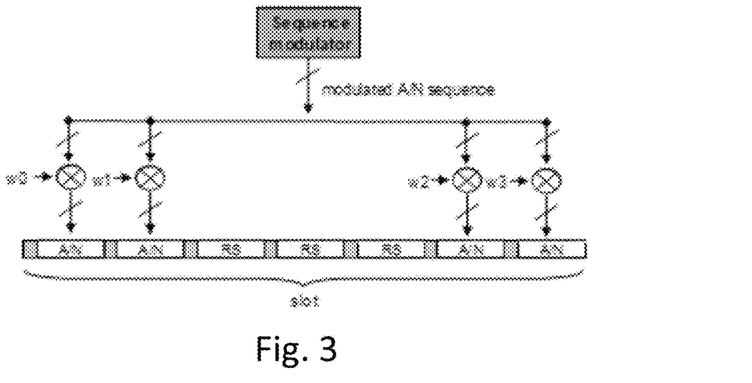
FIG. 3 illustrates an example of the block spreading operation for LTE PUCCH format 1a/1b.

LTE PUCCH format 1/1a/1b may be used for SR transmission in LTE. LTE PUCCH format 1/1a/1b has high multiplexing capacity providing up-to 36 parallel resources. This is achieved by means for combination of (CA)ZAC sequence modulation (up-to 12 cyclic shifts per symbol) and orthogonal cover code (OCC). FIG. 3 illustrates an example of the block spreading operation for PUCCH format 1a/1b, in the case of LTE/Normal cyclic prefix (CP) length. In particular, FIG. 3 depicts a principle of orthogonal cover code applied for PUCCH Format 1a/1b (control information part), spreading SF=4. OCC length for uplink control information (A/N) part is four, and for reference signal part three, respectively. Multiplexing capacity is defined by the RS part (12×3=36). LTE scheduling request (SR) utilizes PUCCH format 1. The difference between SR format (i.e., PUCCH Format 1) and A/N format (i.e., PUCCH Format 1a/1b) is that in the case of SR, both "RS sequence" and "A/N sequence" are unmodulated, whereas in the case of A/N transmission only RS part is unmodulated (in other words, OCC is applied for unmodulated cyclic shift of a CAZAC sequence).

Figure 4:
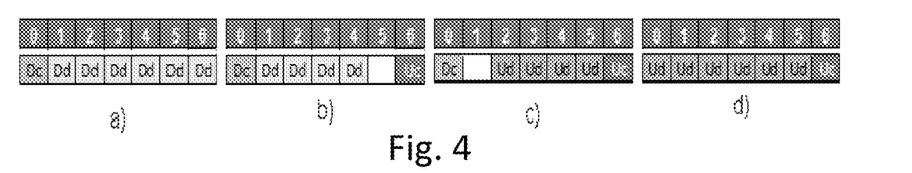
FIG. 4 illustrates an example TDD scenario with seven symbol slot.

In NR, the number of symbols available for SR transmission may vary greatly depending on the slot type. For example, FIG. 4 illustrates an example TDD scenario with seven symbol slot, in which there can be: a) DL only slot: 0 symbols available for uplink control information (including scheduling request); b) Bi-directional DL slot: 1 symbols available for UCI (incl. SR); c) Bi-directional UL slot: 5 symbols available for UCI; and d) UL only slot: 7 symbols available for UCI. The slot length may also vary between 7 and 14. Furthermore, the length of guard period in bi-directional slots may vary, which will reduce the number of available for UCI. The number of symbols in slot reserved for short PUCCH may also vary between different slots.

Some problems that are addressed by certain embodiments (especially from scheduling request point of view) may include the following. The slot type varies in time according to a semi-static configuration (i.e., periodic pattern of slot types) or according to dynamic slot type indication. It is important to support SR transmission in most of slot types, to minimize latency while supporting SR resources for a considerable number of UEs. The number of symbols available for UCI varies greatly depending on the slot type, and the slot configuration. The varying number of symbols available for UCI makes it very difficult to utilize orthogonal cover code for different PUCCH formats. This is the case especially, when applying frequency hopping for PUCCH (intra-slot frequency hopping can be seen as a mandatory requirement for long PUCCH since it has a performance impact). On the other hand, OCC (or generally speaking CDM between different symbols) is required in order to achieve high multiplexing capacity for UCI, while maximizing the UL coverage for UCI (without coverage limit, TDM would be equally valid solution).

Based on the problems discussed above, certain embodiments are able to define orthogonal cover code in the scenario where the number of symbols is available for UCI transmission varies from slot to slot (according to slot type), to manage the varying control channel capacity between slots, to ensure that control channel performance (e.g., for scheduling request) can be maximized in different slot types, and to maximize the control channel capacity, which has a connection to achievable latency with given number of active UEs per cell.

With respect to the use of orthogonal cover code with short slot lengths (such as 7 symbols), orthogonal cover code is a promising solution for increased multiplexing capacity especially in the non-coherent case (i.e., having no separate reference signal part included in the transmission) together with cyclic shift based multiplexing within each symbol (orthogonal cyclic shifts of sequence can be provided by zero autocorrelation sequences including either CAZAC sequences or computer search based zero autocorrelation sequences). This is due to the fact that with coherent detection, both demodulation reference signal (DMRS) and UCI require their own OCC. Furthermore, frequency hopping will also reduce the possible OCC lengths and hence opportunities for OCC (due to the fact that OCC must be done within channel coherence time and frequency; otherwise orthogonality between parallel code channels is reduced). For that reason, there is not much (enough) room for OCC if the slot length is short (such as seven symbols) and is further split into 4 portions by frequency hopping as well as by separate DMRS and data portions. However, OCC is applicable also to the case of coherent detection with longer slot lengths, e.g., 14 symbols.

Figure 5:
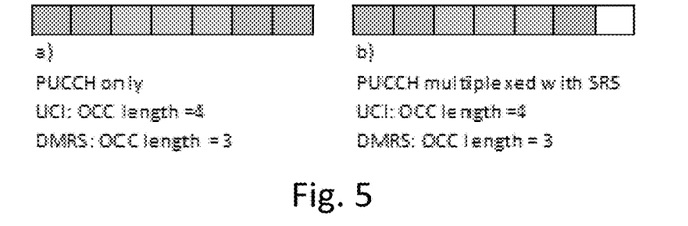
FIG. 5 illustrates an example of an OCC arrangement for PUCCH format 1/1a/1b.

In LTE, the number of symbols available per slot is relatively unchanged from slot to slot. The presence of sounding reference signal (SRS) at the end of the subframe is the only reason causing variation of the number of symbols available per slot for PUCCH (see FIG. 3). Also, in LTE, the presence of subframe containing SRS is configured by higher layer signalling. All UEs are aware of the cell-specific SRS configuration and are able to adjust the OCC accordingly. FIG. 5 illustrates an example of an OCC arrangement for PUCCH format 1/1a/1b: a) without SRS, and b) with SRS, normal cyclic prefix length.

In the case of PUCCH Format 1/1a/1b, the varying number of symbols available for PUCCH does not impact to the multiplexing capacity (due to the fact that multiplexing capacity is upper-limited by the RS portion of slot which is not affected by SRS). On the other hand, in the case of PUCCH format 3, the number of parallel resources available in a certain subframe depends on the presence of SRS subframe. For example, in the case of normal subframe, there are 5 parallel PUCCH format 3 resources/subframe, whereas in the case when SRS is present, there are just four parallel resources available. The varying PUCCH format 3 resource space is managed by means of dynamic L1 DL signalling (so called ARI) included in DL resource allocation grants.

It should be noted that LTE solutions developed for NR do not provide sufficient means to solve the problems discussed above. For example, in the case of periodic signals or periodic transmission opportunities such as resources for scheduling request, L1 DL signalling is not available. Additionally, the available solutions developed for LTE do not allow for capitalizing varying resource space without L1 DL signalling. Hence, further solutions are needed for new radio. Embodiments of the invention, as will be discussed in detail below, provide such solutions.

Certain embodiments will be described below using NR scheduling request as example. With short slot lengths (such as 7 symbols), orthogonal cover code (OCC) is a possible solution for increased multiplexing capacity especially in the non-coherent case. On the other hand, some embodiments are extendable also to the case of coherent detection, especially when the slot length is ≥6 symbols (i.e., supporting OCC of length 2 and frequency hopping at least for UCI). Certain embodiments may also be discussed in the context of slots, but it some embodiments may also be used in the context of other transmission time intervals such as mini-slots.

Based on the above, one scenario is such where OCC is used to provide a resource pool (resource blocks or set of resources) with high multiplexing capacity primarily for scheduling requests (or any other signalling utilizing non-coherent transmission such as on-off keying or channel selection within available resource pool). Resource may be understood as time, frequency and, possibly, sequence (e.g., composed from a combination of zero autocorrelation sequence and orthogonal cover code) or spreading code available for transmission. In this scenario, coherent transmission (e.g., HARQ-ACK) is conveyed via another resource pool. In the case when a scheduling request needs to be transmitted simultaneously with HARQ-ACK on PUCCH, it can be multiplexed with HARQ-ACK data (scheduling request resource becomes unused).

Some embodiments focus on the TDD scenario (flexible TDD). However, certain embodiments may be used also in certain FDD scenarios. Further, in some embodiments, slot type may vary dynamically and/or semi-statically based on NR/5G node B (gNB) scheduling and/or configuration.

One embodiment is built around multiple (e.g., at least two) resource pools for scheduling request. In an embodiment, each resource pool may be associated to a predefined slot type or slot types as well as a predefined PUCCH container (that is, specific PUCCH format). Table 1 below illustrates an example of the resource pools and their associated container, slot type and SR multiplexing capacity. In an embodiment, there are up-to three resource pools with different size. When multiple resource pools are associated to the same slot type, the resource pools are non-overlapping.

TABLE 1

|  | Container | Slot type | SR Multiplexing capacity |
| --- | --- | --- | --- |
| $1^{st}$ resource pool | Long PUCCH | Bi-directional UL slot and UL only slot | R1 |
| $2^{nd}$ resource pool | Long PUCCH | UL only slot | R2 |
| $3^{rd}$ resource pool | Short PUCCH | Bi-directional DL slot | R3 |

In one embodiment, SR transmission may be based on unmodulated (CA)ZAC sequences in all resource pools. According to an embodiment, the 1st and the 2nd resource pools may additionally utilize OCC (or OCCs) for increasing multiplexing capacity per slot. The OCC length may be selected such that the (minimum) OCC length corresponding to the 1st resource pool<the (minimum) OCC length corresponding to the 2nd resource pool, respectively. The term "minimum" may be related, e.g., to the case where the number of UCI symbols available in certain slot is an odd number, such as seven. In this scenario, SR transmission may use OCC length 4 and OCC length 3, during the first and the second frequency hop, respectively. In this case, multiplexing capacity of the corresponding resource pool is defined by OCC length 3 (and not by OCC length 4).

In an embodiment, it may be assumed that scheduling request transmission is based on higher layer configuration using the available resource pools, for example using configured SR opportunity timing (e.g., periodic SR opportunities, e.g., defined in terms of slots or mini-slots). A gNB may configure SR resources for a UE from multiple resource pools.

Resources may have different properties. For example, resources 0 . . . (R1-1) in R1 can be seen as primary long PUCCH resources since they're available in both UL only slots, and bi-directional UL slots. Resources R1 ... (R2-1) in R2 can be seen as opportunistic long PUCCH resources, which are available in UL only slots. They can be used as resources improving the frequency of SR opportunities (and reducing the SR latency) in the cases when the number of UL slots is high. These resources may utilize extra SR capacity provided by higher OCC length used in UL only slots and do not overlap with R1 resources in the same slot. Resources in the 3rd resource pool have smaller coverage compared to that of resources in the 1st and the 2nd resource pools. Depending on the configuration, resources of the 3rd resource pool may be available only in bi-directional DL slot, or alternatively they can be available also both in bi-directional UL slot and UL only slot. They can be used as resources improving the frequency of SR opportunities (and reducing the SR latency) for UEs not in the cell edge.

Figure 6:
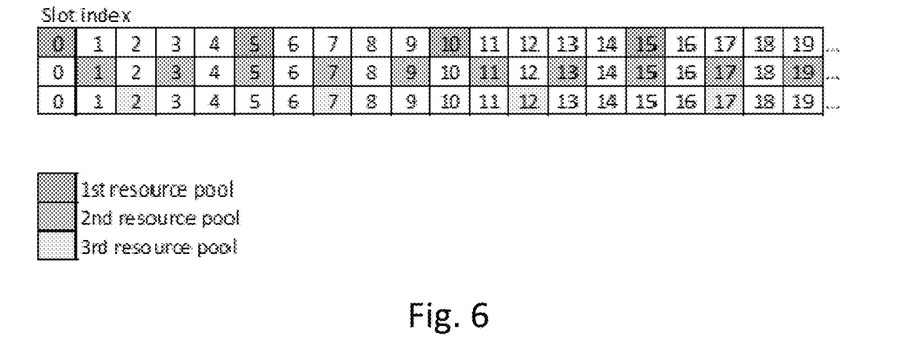
FIG. 6 illustrates an example configuration for a UE, according to an embodiment.

FIG. 6 illustrates an example configuration for an UE. The example of FIG. 6 is for three resource pools. Available (configured) resources in different resource pools are shown with highlighted boxes. When a UE is supposed to transmit SR in certain slot, it will first determine the slot type. Based on the determined slot type and SR resource configuration, the UE may determine whether it has SR allocation available in different resource pools, for example, according to the following. If it is DL only slot, then no transmission. If it is bi-directional DL slot, the transmission is possible if the UE has resource available in resource pool R3. If it is bi-directional UL slot, then transmission is possible if the UE has resources available in resource pool R1 or R3 (if R3 is associated with bi-directional UL slot). If it is UL only slot, then transmission is possible if the UE has resource available in resource pool R1, R2 or R3 (if R3 is associated with bi-directional UL slot). Alternatively, a UE may first determine whether or not it may have SR allocation available in any of SR resource pools according to the SR opportunity timings of the configured SR resources. After that, the UE may determine the slot type. Based on the determined slot type and SR resource configuration, the UE may determine whether it actually has SR allocation available in different resource pools. The UE is supposed to transmit SR when a scheduling request procedure has been started, e.g., by arrival of data to be transmitted to gNB to UE's medium access control.

If one or more SR resources are available, the UE may select one SR resource and transmit SR via current slot. For example, the UE may utilize the prioritized resource from R1, R2 or R3. Prioritization rules may be configured via higher layer signalling, or alternatively derived based on predefined rules. An exemplary rule is the following: R2>R1>R3, i.e., R2 resource is prioritized over R1 resource and R3 resource, R1 resource is prioritized over R3 resource.

If a UE is transmitting other UCI (such as HARQ-ACK) via PUCCH during the same slot, the SR may be multiplexed with other UCI. In this case, SR resource may be left unused. Otherwise, the UE may wait for next SR opportunity according to configuration.

According to an embodiment, the determination of the slot type may be based on at least one of common DCI, dedicated DCI, or semi-static higher layer configuration determining periodic pattern of slot types.

In one embodiment, OCC may be defined separately for each slot type. In the non-coherent case, the number of symbols available for PUCCH in the slot may be determined and then divided "as evenly as possible" into two parts to support frequency hopping. Depending on the usage scenario, the last symbol (the number of symbols allocated to short PUCCH) may or may not be used for long PUCCH. This may be taken into account in the determination of available symbols.

Figure 7:
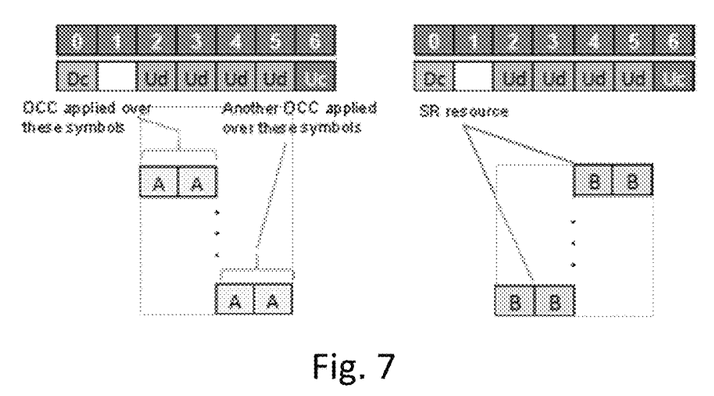
FIG. 7 illustrates an example of the use of OCC and SR resource structure, according to an embodiment.

FIG. 7 illustrates an example of the use of OCC and SR resource structure. Both FIGS. 7a and 7b illustrate a SR resource (resource A and resource B) on long PUCCH in bi-directional UL slot. In both cases, there occurs single frequency hop from one PRB to another PRB in the middle of slot. Based on FIG. 7, it may be natural to pair the SR resources A and B together (as it is done in LTE) to obtain full usage of PRBs. As shown in FIG. 7, OCC length of 2 can be used within both portions of slot. In addition to OCC, SR sequences can be orthogonally multiplexed also within symbols by use of orthogonal sequences (e.g., cyclic shifts of (CA)ZAC sequence) or by use of Interleaved frequency-division multiple-access (IFDMA). In the frequency domain, SR transmission may cover one or multiple resource blocks (12 subcarriers) at a time.

In an embodiment, multiplexing capacity per PRB (or group of PRBs) may be defined for each slot type, based on the minimum OCC length (+cyclic shift difference between adjacent resources as well as potential IFDM component within each symbol).

Figure 8:
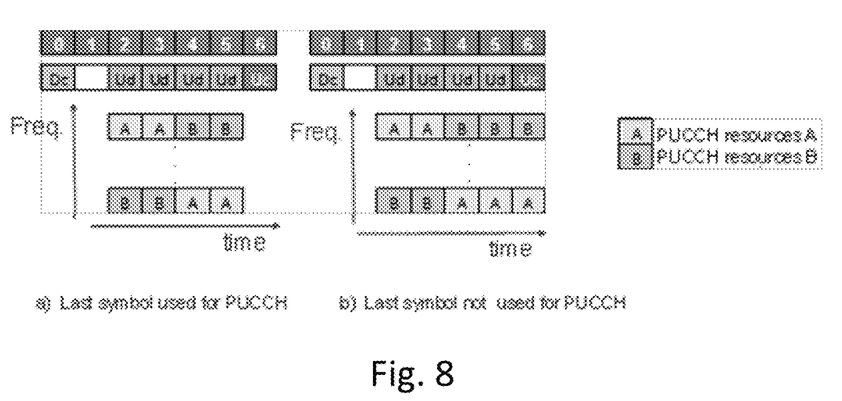
FIG. 8 illustrates examples of long PUCCH arrangement for bi-directional UL slot.
Figure 9:
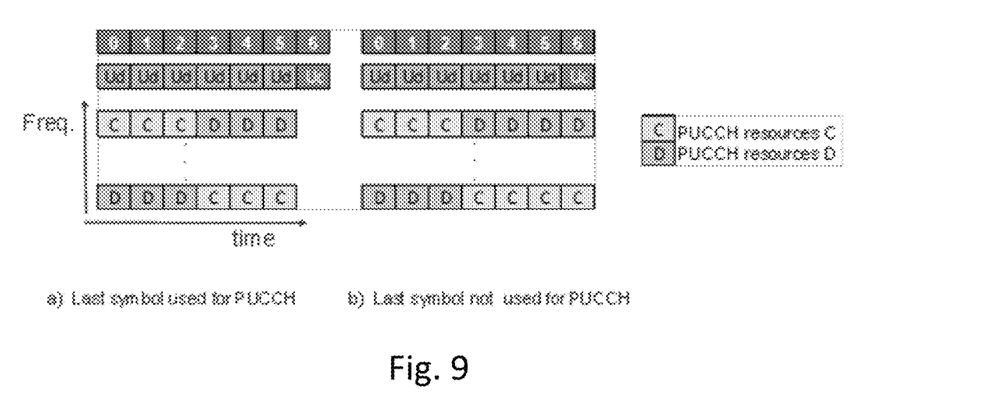
FIG. 9 illustrates examples of long PUCCH arrangement for UL only slot.

FIG. 8 and FIG. 9 illustrate examples of long PUCCH arrangement for bi-directional UL slot and UL only slot, respectively. These examples cover the scenario with 7 symbol slot.

In FIG. 8, minimum OCC length equals to 2. Additionally, 12 cyclic shifts are available per symbol. This means that each PUCCH resource set (PRB) (e.g., PUCCH resources A) contains 2×12=24 scheduling request resources.

In FIG. 9, minimum OCC length equals to 3. Additionally, 12 cyclic shifts are available per symbol. This means that each resource set (PRB) contains 3×12=36 scheduling request resources. Short PUCCH may occupy a portion of PRBs on the last symbol of slot. Multiplexing may be based on cyclic shifts and/or IFDMA combs or on other frequency interleaved structure (to ensure sufficient frequency diversity). For example, 48 subcarriers on 4 PRBs may support 24 resources.

In the examples shown in FIGS. 8 and 9, UL only slot can support 1.5 times the SR resources than bi-directional UL slot for the same number of PRBs allocated for SR. According to an embodiment, both slot types support resource pool R1 which can be used to provide basic periodic SR opportunities in the cell. UL only slot can support additionally resource pool R2 which can be used to reduce SR latency by providing, when available, additional SR resources for UEs.

Figure 10:
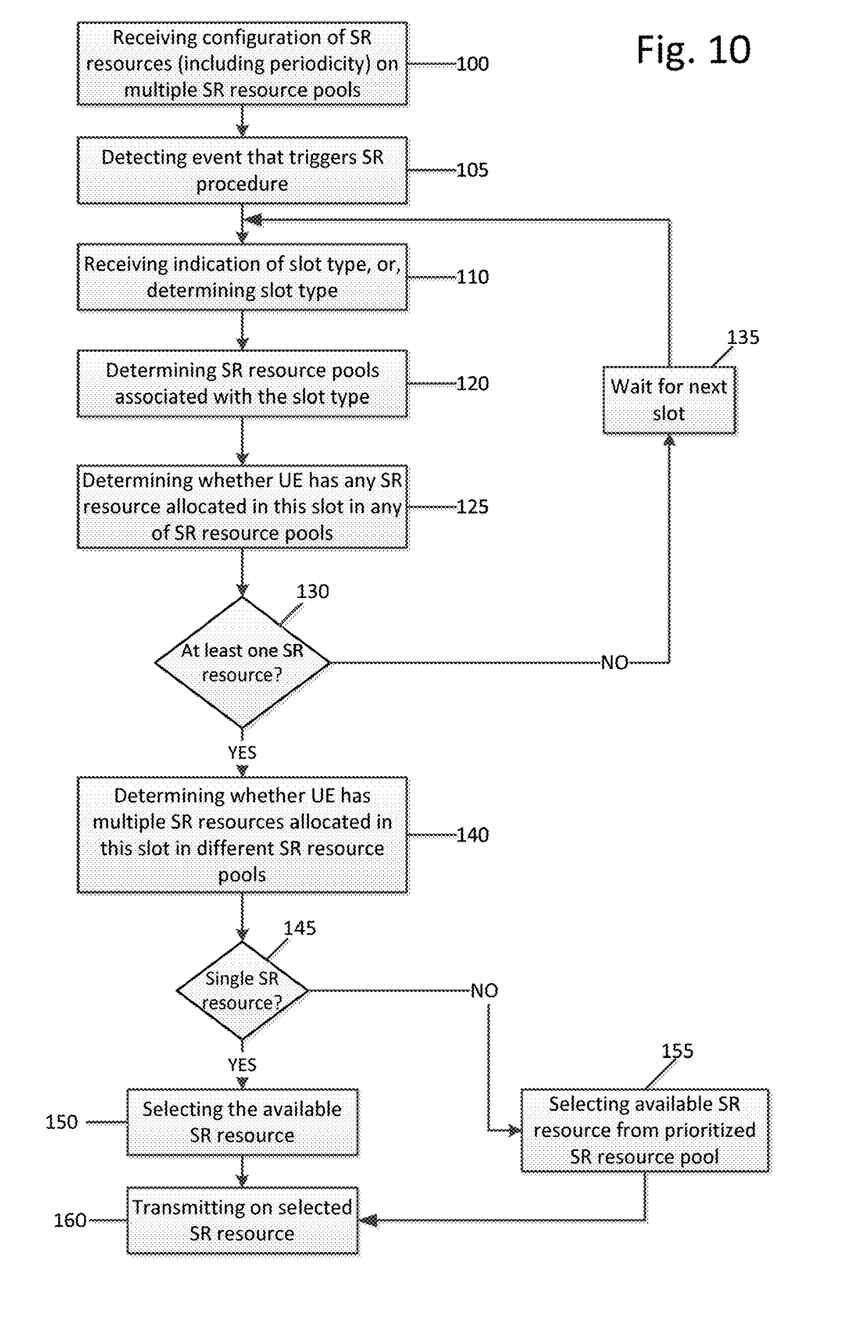
FIG. 10 illustrates an example of a flow diagram for a method of UE's SR transmission, according to an embodiment.

FIG. 10 illustrates an example of a flow diagram for a method of UE's SR transmission, according to an embodiment. The flow diagram of FIG. 10 depicts an example case in which SR resources are periodic and slot type is dynamically indicated. It should be noted that the method of FIG. 10 does not necessarily need to be performed in the exact order depicted therein. Indeed, in certain embodiments, the steps depicted in FIG. 10 may be performed in a different order. As illustrated in FIG. 10, the method may include, at 100, receiving a configuration of SR resources (e.g., including periodicity) on multiple SR resource pools. At 105, an event (e.g., the arrival of data to MAC) may trigger a scheduling request procedure. The method may also include, at 110, determining slot type or receiving an indication of the slot type. At 120, the method may include determining SR resource pools associated with the slot type. The method may then include, at 125, determining whether the UE has any SR resource allocated in this slot in any of the SR resource pools (e.g., based on the configured SR periodicities of SR resources).

At 130, it is determined whether at least one SR resource is available. If it is determined that no SR resources are available, then, at 135, the UE may wait for the next slot and return to step 110. In some embodiments, the steps of determining whether the UE has a SR resource allocated 125, the step of determining whether the at least one SR resource is available 130, and the step of waiting for the next slot 135 may be performed before determining the slot type 110.

If at least one SR resource is available, then the method may include, at 140, determining whether the UE has multiple SR resources allocated in this slot in different SR resource pools. At 145, it is determined whether there are more than one SR resources. If it is determined that there is a single available SR resource, then the method includes, at 150, selecting the available resource. If it is determined that there are multiple SR resources, then the method may include, at 155, selecting a highest priority available SR resource from a prioritized SR resource pool. The method may then include, at 160, transmitting SR on the selected SR resource.

Figure 11:
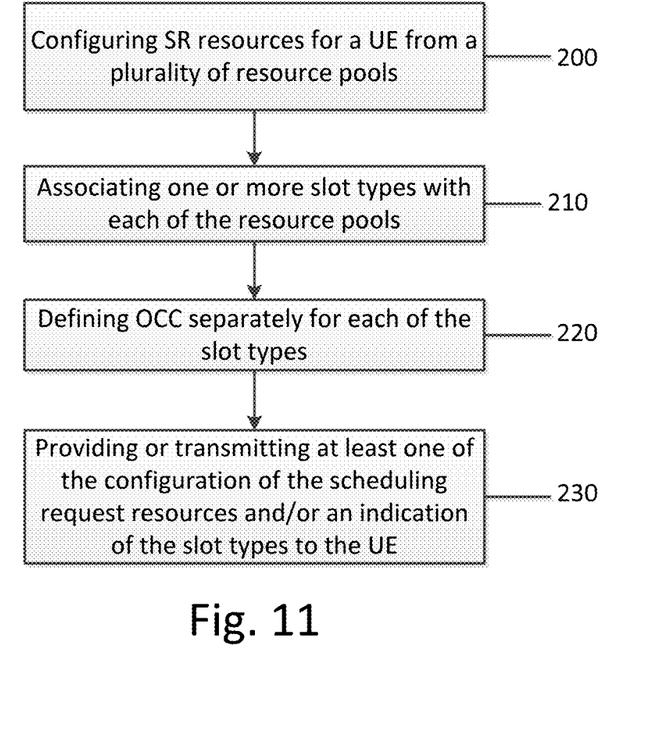
FIG. 11 illustrates an example of a flow diagram for a method, according to another embodiment.

FIG. 11 illustrates an example of a flow diagram for a method, according to another embodiment. In an embodiment, the method of FIG. 11 may be performed by a network node, such as a base station, eNB, or gNB. According to an embodiment, the method may include, at 200, configuring SR resources for a UE from a plurality of resource pools. SR transmission may be based on higher layer configuration using the available resource pools. The method may also include, at 210, associating one or more slot types with each of the resource pools. In an embodiment, the method may include, at 220, defining OCC separately for each of the slot types. According to an embodiment, the slot type may include a DL only slot, a bi-directional DL slot, a bi-directional UL slot, and/or an UL only slot.

In certain embodiments, resources of the resource pools may have different properties. For example, resources in the $1^{st}$ resource pool may be primary long PUCCH resources and are available in both UL only slots and bi-directional UL slots. Resources in the $2^{nd}$ resource pool may be opportunistic long PUCCH resources, which are available in UL only slots. They can be used as resources improving the SR periodicity (and reducing the SR latency) in the cases when the number of UL slots is high. These resources utilize extra SR capacity provided by higher OCC length used in UL only slots and do not overlap with $1^{st}$ resource pool resources in the same slot. Resources in the $3^{rd}$ resource pool may have smaller coverage compared to that of resources in the $1^{st}$ and the $2^{nd}$ resource pools. Depending on the configuration, resources of the $3^{rd}$ resource pool may be available only in bi-directional DL slot, or alternatively may be available also both in bi-directional UL slot and UL only slot. They can be used as resources improving the SR periodicity (and reducing the SR latency) for UEs not in the cell edge. Furthermore, they can be used as SR resources when traffic profile in TDD cells using dynamic traffic adaptation is DL-heavy, and most of the slots are allocated for DL data.

Referring again to FIG. 11, the method may further include, at 230, providing or transmitting at least one of the configuration of the scheduling request resources and/or an indication of the slot types to the UE.

Figure 12A:
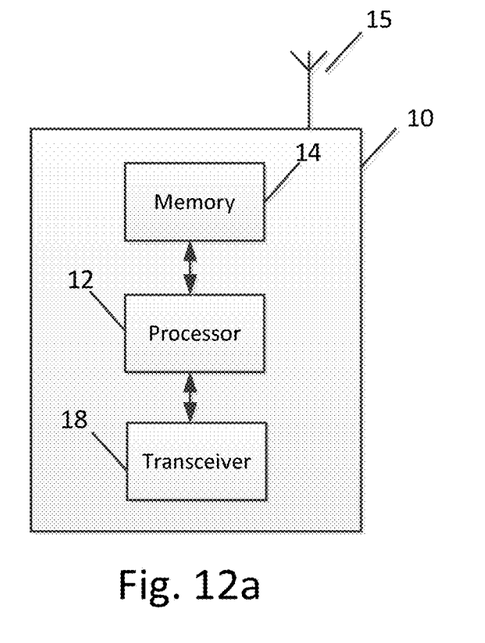
FIG. 12a illustrates a block diagram of an apparatus, according to an embodiment.

FIG. 12a illustrates an example of an apparatus 10 according to an embodiment. In an embodiment, apparatus 10 may be a node, host, or server in a communications network or serving such a network. For example, apparatus 10 may be a base station, a node B, an evolved node B, 5G node B or access point, next generation node B (NG-NB or gNB), WLAN access point, mobility management entity (MME), or subscription server associated with a radio access network, such as a GSM network, LTE network or 5G radio access technology. It should be noted that one of ordinary skill in the art would understand that apparatus 10 may include components or features not shown in FIG. 12a.

As illustrated in FIG. 12a, apparatus 10 may include a processor 12 for processing information and executing instructions or operations. Processor 12 may be any type of general or specific purpose processor. While a single processor 12 is shown in FIG. 12a, multiple processors may be utilized according to other embodiments. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, node B, eNB, 5G node B (gNB) or access point, WLAN access point, or the like. According to certain embodiments, apparatus 10 may be controlled by memory 14 and processor 12 to perform the functions associated with embodiments described herein.

In one embodiment, apparatus 10 may be controlled by memory 14 and processor 12 to configure SR resources for a UE from a plurality of resource pools. SR transmission may be based on higher layer configuration using the available resource pools. According to an embodiment, apparatus 10 may be controlled by memory 14 and processor 12 to associate one or more slot types with each of the resource pools. In an embodiment, apparatus 10 may be controlled by memory 14 and processor 12 to define OCC separately for each of the slot types. According to an embodiment, the slot type may include a DL only slot, a bi-directional DL slot, a bi-directional UL slot, and/or an UL only slot.

In certain embodiments, resources of the resource pools may have different properties. For example, resources in the $1^{st}$ resource pool may be primary long PUCCH resources and are available in both UL only slots and bi-directional UL slots. Resources in the $2^{nd}$ resource pool may be opportunistic long PUCCH resources, which are available in UL only slots. They can be used as resources improving the SR periodicity (and reducing the SR latency) in the cases when the number of UL slots is high. These resources utilize extra SR capacity provided by higher OCC length used in UL only slots and do not overlap with $1^{st}$ resource pool resources in the same slot. Resources in the $3^{rd}$ resource pool may have smaller coverage compared to that of resources in the $1^{st}$ and the $2^{nd}$ resource pools. Depending on the configuration, resources of the $3^{rd}$ resource pool may be available only in bi-directional DL slot, or alternatively may be available also both in bi-directional UL slot and UL only slot. They can be used as resources improving the SR periodicity (and reducing the SR latency) for UEs not in the cell edge.

In one embodiment, apparatus 10 may be further controlled by memory 14 and processor 12 to provide or transmit at least one of the configuration of the scheduling request resources and/or an indication of the slot types to the user equipment.

Figure 12B:
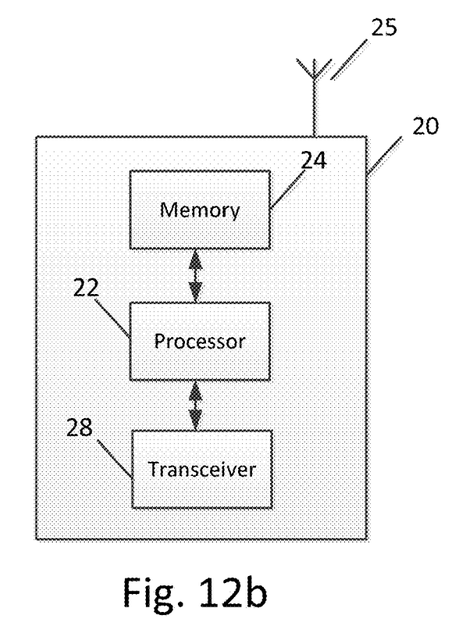
FIG. 12b illustrates a block diagram of an apparatus, according to another embodiment.

FIG. 12b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, Apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, NB-IoT, LTE, LTE-A, 5G, WLAN, WiFi, Bluetooth, NFC, and any other radio access technologies. It should be noted that one of ordinary skill in the art would understand that apparatus 20 may include components or features not shown in FIG. 12b.

As illustrated in FIG. 12b, apparatus 20 may include or be coupled to a processor 22 for processing information and executing instructions or operations. Processor 22 may be any type of general or specific purpose processor. While a single processor 22 is shown in FIG. 12b, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, NB-IoT, LTE, LTE-A, 5G, WLAN, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. According to an embodiment, apparatus 20 may be controlled by memory 24 and processor 22 to receive a configuration of SR resources (e.g., including periodicity) on multiple SR resource pools. In an embodiment, apparatus 20 may be controlled by memory 24 and processor 22 to detect an event (e.g., the arrival of data to MAC) that may trigger a scheduling request procedure. According to certain embodiments, apparatus 20 may be controlled by memory 24 and processor 22 to determine a slot type(s) or receive an indication of the slot type(s). In an embodiment, apparatus 20 may be controlled by memory 24 and processor 22 to determine SR resource pools associated with the slot type. Apparatus 20 may also be controlled by memory 24 and processor 22 to determine whether the apparatus 20 has any SR resource allocated in this slot in any of the SR resource pools (e.g., based on the configured SR periodicities of SR resources).

In some embodiments, apparatus 20 may be controlled by memory 24 and processor 22 to determine whether at least one SR resource is available. If it is determined that no SR resources are available, then apparatus 20 may be controlled by memory 24 and processor 22 to wait for the next slot and return to the step of determining or receiving a slot type(s). If at least one SR resource is available, then apparatus 20 may be controlled by memory 24 and processor 22 to determine whether the UE has multiple SR resources allocated in this slot in different SR resource pools. In an embodiment, apparatus 20 may be controlled by memory 24 and processor 22 to determine whether there are more than one SR resources. If it is determined that there is a single available SR resource, then apparatus 20 may be controlled by memory 24 and processor 22 to select the available resource. If it is determined that there are multiple SR resources, then apparatus 20 may be controlled by memory 24 and processor 22 to select a highest priority available SR resource from a prioritized SR resource pool. According to one embodiment, apparatus 20 may be controlled by memory 24 and processor 22 to transmit SR on the selected SR resource.

In view of the above, embodiments of the invention provide several technical improvements and/or advantages. For example, certain embodiments are able to provide a framework to utilize different SR containers for NR. Embodiments cover both long PUCCH and short PUCCH, and also cover different slot types. Certain embodiments can allow for maximizing the SR multiplexing capacity, can support varying SR capacity between slots (due to varying slot type), and (including also OCC component) may be fully scalable in terms of different slot configurations. In addition, some embodiments are fully compatible with flexible TDD (supporting flexible traffic adaptation between DL and UL). Furthermore, embodiments also allow for maximizing SR coverage. As such, embodiments of the invention can improve performance and throughput of network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
receiving, by user equipment, configuration of scheduling request resources on a plurality of resource pools;
determining a slot type when the user equipment is to transmit a scheduling request in a certain slot;
based on the determined slot type and the received scheduling request resources configuration, determining whether the user equipment has a scheduling request resource allocated in the plurality of resource pools in the certain slot; and
determining the certain slot in which user equipment is to transmit a scheduling request at least partially based on configured periodic time instances of the scheduling request resources, wherein, when at least one allocated scheduling request resource is available, the method further comprises:
selecting one of the at least one available scheduling request resource; and
transmitting the scheduling request on the selected one scheduling request resource.

2. The method according to claim 1, wherein the determining of whether the user equipment has the scheduling request resource allocated in the plurality of resource pools is based on an association of one or more slot types with each of the resource pools.

3. The method according to claim 1, wherein, when more than one scheduling request resource is available, selecting a scheduling request resource with a highest priority.

4. The method according to claim 1, wherein the determining of the slot type further comprises receiving an indication of the slot type from a new radio node B.

5. The method according to claim 1, wherein the slot type comprises at least one of a downlink only slot, a bi-directional downlink slot, a bi-directional uplink slot, or an uplink only slot.

6. The method according to claim 1, wherein the determining of the slot type is based on at least one of a common downlink control information, a dedicated downlink control information, or a semi-static higher layer configuration determining periodic pattern of slot types.

7. An apparatus, comprising:
at least one processor; and
at least one memory including computer program code;
the at least one memory and the computer program code are configured, with the at least one processor, to cause the apparatus at least to
receive configuration of scheduling request resources on a plurality of resource pools;
determine a slot type when the apparatus is to transmit a scheduling request in a certain slot;
based on the determined slot type and the received scheduling request resources configuration, determine whether the apparatus has a scheduling request resource allocated in the plurality of resource pools in the certain slot; and
determine the certain slot in which user equipment is to transmit a scheduling request at least partially based on configured periodic time instances of the scheduling request resources,
wherein, when at least one allocated scheduling request resource is available, the at least one memory and the computer program code are configured, with the at least one processor, to cause the apparatus at least to:
select one of the at least one available scheduling request resource; and
transmit the scheduling request on the selected one scheduling request resource.

8. The apparatus according to claim 7, wherein the at least one memory and the computer program code are configured, with the at least one processor, to cause the apparatus at least to determine whether the user equipment has the scheduling request resource allocated in the plurality of resource pools based on an association of one or more slot types with each of the resource pools.

9. The apparatus according to claim 7, wherein, when more than one scheduling request resource is available, the at least one memory and the computer program code are configured, with the at least one processor, to cause the apparatus at least to select a scheduling request resource with a highest priority.

10. The apparatus according to claim 7, wherein the at least one memory and the computer program code are configured, with the at least one processor, to cause the apparatus at least to receive an indication of the slot type from a new radio node B.

11. The apparatus according to claim 7, wherein the slot type comprises at least one of a downlink only slot, a bi-directional downlink slot, a bi-directional uplink slot, or an uplink only slot.

12. The apparatus according to claim 7, wherein the at least one memory and the computer program code are configured, with the at least one processor, to cause the apparatus at least to determine the slot type based on at least one of a common downlink control information, a dedicated downlink control information, or a semi-static higher layer configuration determining periodic patter of slot types.

13. The apparatus according to claim 7, wherein the apparatus comprises a user equipment.

14. A method, comprising:
configuring, by a network node, scheduling request resources for a user equipment from a plurality of resource pools;
providing the configuration of the scheduling request resources to the user equipment; and
receiving a scheduling request on one of the scheduling request resources, wherein said one of the scheduling request resources is determined based on a slot type and the scheduling request resources configuration,
wherein a first resource pool of the plurality of resource pools comprises primary long physical uplink control channel resources available in uplink only slots and bi-directional uplink slots,
wherein a second resource pool of the plurality of resource pools comprises long physical uplink control channel resources available in uplink only slots, and
wherein a third resource pool of the plurality of resource pools comprises resources available only in a bi-directional downlink slot or available both in a bi-directional uplink slot and an uplink only slot.

15. The method according to claim 14, further comprising associating one or more slot types with each of the resource pools.

16. The method according to claim 14, defining orthogonal cover code separately for one or more of the slot types.

17. The method according to claim 14, wherein the slot type comprises at least one of a downlink only slot, a bi-directional downlink slot, a bi-directional uplink slot, or an uplink only slot.

18. An apparatus, comprising:
at least one processor; and
at least one memory including computer program code;
the at least one memory and the computer program code are configured, with the at least one processor, to cause the apparatus at least to
configure scheduling request resources for a user equipment from a plurality of resource pools;
provide the configuration of the scheduling request resources to the user equipment; and
receive a scheduling request on one of the scheduling request resources, wherein said one of the scheduling request resources is determined based on a slot type and the scheduling request resources configuration, wherein a first resource pool of the plurality of resource pools comprises primary long physical uplink control channel resources available in uplink only slots and bi-directional uplink slots,
wherein a second resource pool of the plurality of resource pools comprises long physical uplink control channel resources available in uplink only slots, and
wherein a third resource pool of the plurality of resource pools comprises resources available only in a bi-directional downlink slot or available both in a bi-directional uplink slot and an uplink only slot.

19. The apparatus according to claim 18, wherein the at least one memory and the computer program code are configured, with the at least one processor, to cause the apparatus at least to associate one or more slot types with each of the resource pools.

20. The apparatus according to claim 18, wherein the at least one memory and the computer program code are configured, with the at least one processor, to cause the apparatus at least to define orthogonal cover code separately for one or more of the slot types.

21. The apparatus according to claim 18, wherein the slot type comprises at least one of a downlink only slot, a bi-directional downlink slot, a bi-directional uplink slot, or an uplink only slot.

22. The apparatus according to claim 18, wherein the apparatus comprises a new radio node B.

* * * * *

UNITED STATES PATENT AND TRADEMARK OFFICE
CERTIFICATE OF CORRECTION

PATENT NO. : 10,499,424 B2
APPLICATION NO. : 15/424283
DATED : December 3, 2019
INVENTOR(S) : Esa Tapani Tiirola and Kari Juhani Hooli It is certified that error appears in the above-identified patent and that said Letters Patent is hereby corrected as shown below:

In the Claims

Claim 1, Column 17, Line 28:
Change "user equipment is to transmit" to --the user equipment is to transmit--

Claim 7, Column 18, Line 6:
Change "user equipment is to transmit" to --the apparatus is to transmit--

Claim 8, Column 18, Line 21:
Change "the user equipment" to --the apparatus--

Signed and Sealed this
Ninth Day of June, 2020

Andrei Iancu
*Director of the United States Patent and Trademark Office*